United States Patent [19]
Monda et al.

[11] Patent Number: 4,896,588
[45] Date of Patent: Jan. 30, 1990

[54] SELF-CLEANING CABIN AIRFLOW REGULATING DEVICE

[75] Inventors: Damian G. Monda, Seattle, Wash.; Douglas E. Peash, Cheboygan, Mich.

[73] Assignee: The Boeing Company, Seattle, Wash.

[21] Appl. No.: 148,765

[22] Filed: Jan. 26, 1988

[51] Int. Cl.⁴ .......................................... F24F 13/072
[52] U.S. Cl. .................................. 98/1; 98/DIG. 10; 181/225; 181/258
[58] Field of Search ...................... 98/1, 1.5, 2, 13, 14, 98/40.01, 40.02, 40.11, 40.16, 40.17, 40.18, DIG. 10; 181/224, 258

[56] References Cited

U.S. PATENT DOCUMENTS

| | | | |
|---|---|---|---|
| 1,721,385 | 7/1929 | Furnivall et al. | 181/258 |
| 2,172,771 | 9/1939 | Norris | 181/224 X |
| 2,187,546 | 1/1940 | Orem . | |
| 2,768,706 | 10/1956 | Fischer . | |
| 2,781,715 | 2/1957 | Labus | 98/40.18 X |
| 2,795,291 | 6/1957 | Pierce . | |
| 3,395,519 | 8/1968 | Kleissler | 55/304 |
| 3,472,002 | 10/1969 | Brown et al. | 55/272 |
| 3,722,186 | 3/1973 | Parker et al. | 55/304 |
| 3,759,157 | 9/1973 | Lärkfeldt et al. | 98/40.18 X |
| 4,222,755 | 9/1980 | Grotto | 55/291 |
| 4,226,715 | 10/1980 | Niederer et al. | 210/783 |
| 4,253,855 | 3/1981 | Jackson et al. | 55/290 |
| 4,262,495 | 4/1981 | Gupta et al. | 62/402 |
| 4,296,780 | 10/1981 | Norbäch | 138/40 |
| 4,377,401 | 3/1983 | Laughlin | 55/290 |
| 4,399,739 | 8/1983 | Dean | 98/DIG. 10 X |
| 4,482,365 | 11/1984 | Roach | 55/218 |
| 4,514,193 | 4/1985 | Booth | 55/290 |
| 4,517,813 | 5/1985 | Eggebrecht et al. | 62/284 |
| 4,548,068 | 10/1985 | Gualtieri et al. | 98/40.11 X |

FOREIGN PATENT DOCUMENTS

| | | | |
|---|---|---|---|
| 1262069 | 10/1986 | U.S.S.R. | 181/224 |
| 2020741 | 11/1979 | United Kingdom | 181/258 |

Primary Examiner—Harold Joyce
Attorney, Agent, or Firm—Christensen, O'Connor, Johnson & Kindness

[57] ABSTRACT

A self-cleaning airflow regulator (100) includes a partially air pervious poppet cylinder (134) disposed between a pair of spaced-apart sidewalls (130, 132) of a restriction chamber (128) to move along the sidewalls in a direction transversely to the length of the poppet cylinder toward and away from an air inlet (136) for directing supply air into the restriction chamber. The restriction chamber includes an air outlet (138) located on the opposite side of the poppet cylinder from a location of the inlet (136). Air entering the restriction chamber (128) through the inlet (136) pushes against the poppet cylinder to force the poppet cylinder to move toward the outlet (138) at the same time causing the poppet cylinder to rotate about its longitudinal axis due to the reactive contact of the poppet cylinder with diagonally disposed fibers (170) mounted on the inside surfaces of the walls (130, 132) of the restriction chamber. The rotation of the poppet cylinder (134) about its longitudinal axis place a new section of the poppet cylinder in alignment with the outlet (138) so that dust and other particulate matter collected on the outer surface of the poppet cylinder is removed therefrom by the air which leaves the poppet cylinder through the outlet (138). Air entering the restriction chamber is reduced in flow rate and pressure first during passage into the regulator inlet, then during passage into the poppet cylinder and then again during passage out from the poppet cylinder for exit from the restriction chamber through outlet (138).

39 Claims, 5 Drawing Sheets

SELF-CLEANING CABIN AIRFLOW REGULATING DEVICE

TECHNICAL FIELD OF THE INVENTION

The present invention relates to a device for regulating the flow of fluids and, more particularly, to a device especially adapted for regulating the flow of air to an enclosure, such as an aircraft cabin.

BACKGROUND OF THE INVENTION

To meet the ventilation needs of passenger aircraft, conditioned air is continuously supplied to the passenger cabin and flight deck. Because of the relatively large number of people that occupy a relatively small volume of space, the air in the passenger cabin is replaced approximately every two (2) minutes. The ventilation air for the passenger cabin and flight deck typically is composed of both recycled stale air withdrawn from the passenger cabin and outside air, for instance, bleed air from the aircraft engine compressor stages. Both the stale cabin air and the outside air are conditioned to a desired temperature by remotely located air conditioning units prior to delivery to the passenger cabin. Although the stale cabin air is also filtered to remove smoke and other particulate matter prior to return to the passenger cabin, in many models of aircraft, the outside air is not filtered. As a result, airport runway debris and atmospheric dust that is ingested into the aircraft engines is allowed to enter into the air distribution system of the aircraft and contaminate the passenger cabin air.

From the remotely located filters and air conditioning units, the air is distributed by ducts to various locations throughout the aircraft. Because of the limited space available in an aircraft, in cross-sectional size the air delivery ducts typically are fabricated as small as possible. As a result, the air is transmitted through the delivery ducts at relatively high pressure and speed. Flow regulators and/or restrictors are used to regulate the flow rate of the air discharged into the passenger cabin. Due to the elevated flow speed and pressure of the air in the delivery ducts, high noise levels are generated in the ducts and the airflow regulators. This noise is a large component of the cabin noise that aircraft passengers are subjected to.

Various attempts have been made to reduce the noise attendant in the supply and discharge of ventilation air to the passenger cabin. For example, sound absorbing materials, such as fiberglass and open cell foam, have been placed within air ducts and restrictors. However, lining the air ducts and restrictors with the acoustic material requires a significant amount of manual labor, and also reduces the interior cross-sectional sizes of these components thereby requiring an even faster air flow speed to maintain the same flow rate. An attempt also has been made to reduce cabin noise by the use of special noise attenuation chambers. The chambers typically are complex in design and labor intensive to fabricate and install.

Experience in the air filter art has shown that air restrictors utilizing fabric materials, such as fiberglass or NOMEX TM, generally are of quieter operation than nonfabric restrictors constructed from, for example, metal or plastic. However, the propensity of fabric air restrictors to collect particulate matter and thus clog in service has prevented their use for airflow regulation in aircraft air distribution systems. The filters employed in conjunction with the recirculated cabin air cannot remove all airborne particulate matter, such as the airport runway debris and atmosphere dust ingested into the aircraft engines.

SUMMARY OF THE INVENTION

The foregoing drawbacks of known airflow regulating devices are addressed by the present invention which provides a self-cleaning airflow regulator composed of a partially air pervious poppet cylinder disposed between a pair of spaced-apart sidewalls of the restriction chamber of a regulator body. An air inlet is provided for directing air into the restriction chamber and an outlet is provided for directing air out of the restriction chamber. The inlet is located on the opposite side of the restriction chamber relative to the poppet cylinder from the location of the air outlet. The air which enters the restriction chamber must first enter the poppet cylinder through the poppet cylinder wall and then flow out of the poppet cylinder through another section of the poppet cylinder wall to exit the restriction chamber. The poppet cylinder is constructed with an outer layer of partially air pervious, flexible, fabric material supported by an underlying frame in the form of a helically wound member or in the form of a perforated tube. Through this construction of the poppet cylinder, the entry of the air into the poppet cylinder and then out of the cylinder results in a reduction of the pressure and flow rate of the air without generating appreciable noise.

The poppet cylinder is adapted to shift transversely between the regulator body sidewalls toward and away from the restriction chamber inlet in response to the level of flow of air through the restriction chamber. Although the poppet cylinder is biased for movement toward the restriction chamber inlet, when sufficient air flows through the restriction chamber, the force of the air impinging against the poppet cylinder overcomes the bias on the poppet cylinder to force the poppet cylinder to move away from the restriction chamber inlet.

As the poppet cylinder is shifted toward and away from the restriction chamber inlet by the biasing force on the poppet cylinder and the counteracting force applied to the poppet cylinder by the air flowing through the restriction chamber, respectively, the poppet cylinder is automatically rotated about its longitudinal axis. Thus, with each movement of the poppet cylinder toward and away from the restriction chamber inlet, a different portion of the outer circumference of the poppet cylinder is in alignment with the poppet cylinder outlet so that air leaving the poppet cylinder and exiting through the restriction chamber outlet carries with it the dust and other particulate matter which has collected on that portion of the outer surface of the poppet cylinder. Accordingly, through the present invention, airflow to a desired location is regulated by the use of fabric restriction material thereby minimizing the level of noise generated in the restrictor, while also providing for the continual cleaning of the fabric restrictor so as to prevent its clogging.

In a further aspect of the present invention, the restriction chamber of the regulator body is constructed in the form of an elongate, trough shape with the sidewalls of the restriction chamber forming the sidewalls of the trough shape, the outlet of the restriction chamber located in the base of the trough shape and the inlet of the restriction chamber defined by inwardly curved edges of the sidewalls of the trough opposite the base of the trough shape. The base of the trough shape is curved to form a seat for receiving the poppet cylinder when the poppet cylinder is shifted away from the inlet to the restriction chamber in reaction to the force of the inlet air blowing against the portion of the outer surface of the poppet cylinder facing the restriction chamber inlet.

According to another aspect of the present invention, the poppet cylinder is biased for movement towards the inlet of the restriction chamber by either a series of spaced-apart compression springs or spring pins that press against the outer surface of the poppet cylinder distal or opposite from the inlet to the restriction chamber. The spring rate of the springs is selected so that the force nominally applied to the poppet cylinder by the springs is sufficient to hold the poppet cylinder against the restriction chamber inlet when no air is flowing therethrough but is overcome by a counteracting force produced by the flow of inlet air pushing against the outer surface of the poppet cylinder facing the inlet of the restriction chamber.

In an additional aspect of the present invention, the poppet cylinder is rotated about its longitudinal axis as it moves transversely towards and away from the inlet to the restriction chamber by fibers in the form of cut piles mounted on the inside surfaces of the housing sidewalls to reactively bear against the outer circumference of the poppet cylinder. The fibers are disposed diagonally to the plane of the housing sidewalls in the circumferential direction of the poppet cylinder so that the fibers on both sidewalls are oriented in the same direction relative to the circumference of the poppet cylinder. As a result, as the poppet cylinder is shifted ("extended") through the restriction chamber away from the inlet, the fibers on one of the sidewalls of the restriction chamber reactively bear against the outer circumference of the poppet cylinder causing the poppet cylinder to rotate about its longitudinal axis whereas the fibers on the opposite sidewall of the restriction chamber resiliently deflect to permit relative movement therebetween with a minimum of resistance. Once the airflow to the restriction chamber has ceased, the poppet cylinder is biased to return ("retract") toward the inlet of the restriction chamber. During such retractive movement, the poppet cylinder is rotated about its longitudinal axis by the reactive contact of the fibers on the opposite restriction chamber sidewall against a circumference of the poppet cylinder. The direction of rotation of the poppet cylinder is in the same direction that the poppet cylinder is rotated during travel of the poppet cylinder away from the inlet to the restriction chamber. The fibers which reactively engage against the outer circumference of the poppet cylinder during extension movement away from the inlet, resiliently deflect during return movement of the poppet cylinder toward the inlet thereby to permit relative movement between the poppet cylinder and such deflected fibers with a minimum of restriction or drag.

In accordance with a further aspect of the present invention, the airflow regulator also includes a diffuser or balance chamber in airflow-receiving communication with the outlet of the restriction chamber. The balance chamber includes one or more outlets to discharge air received from the restriction chamber into the ambient in a substantially uniform manner.

BRIEF DESCRIPTION OF THE DRAWINGS

The details of typical embodiments of the present invention will be described in connection with the accompanying drawings, in which.

DETAILED DESCRIPTION OF THE PREFERRED EMBODIMENTS

Figure 1:
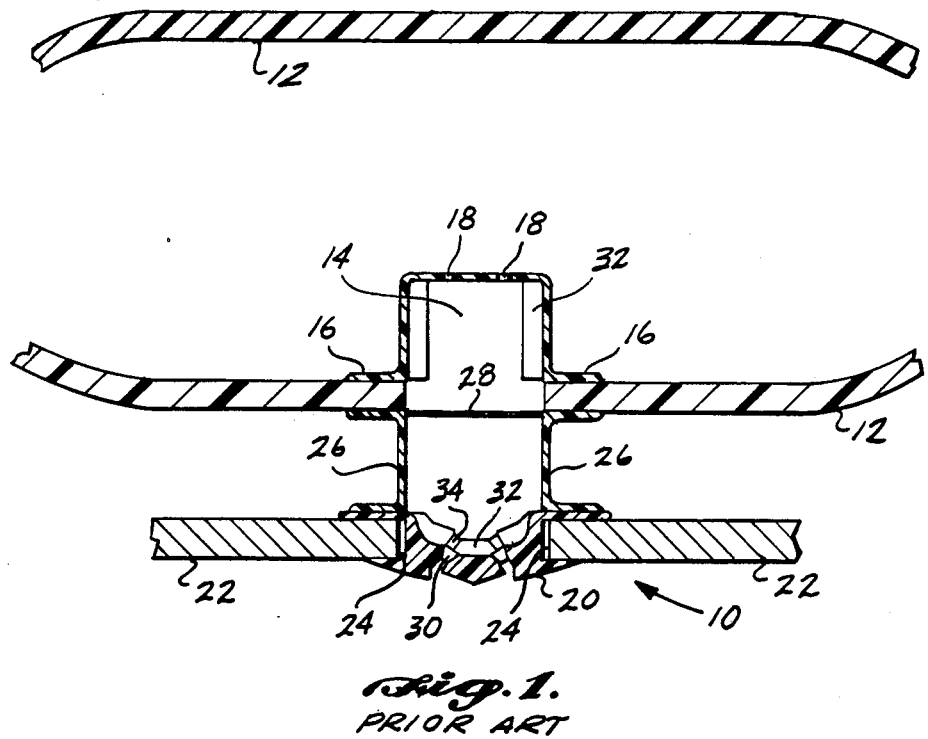
FIG. 1 is a fragmentary cross-sectional view of a prior art air delivery duct utilizing a noise attenuation chamber.

Referring initially to FIG. 1, a regulator 10 for regulating the airflow to the passenger cabin of an aircraft through an overhead air supply duct 12 is illustrated. The regulator 10 includes a noise attenuation chamber 14 that extends along the lower wall of the duct and upwardly into the duct. The noise attenuation chamber 14 is generally U-shaped in cross section and having transverse flanges 16 which overlap the inside surface of duct 12. A plurality of spaced-apart holes 18 are formed in the upper wall of chamber 14 through which the air in duct 12 enters the chamber. A molded nozzle structure 20 is disposed within an opening formed in the ceiling panel 22 at a position beneath and in alignment with the noise attenuation chamber 14. The nozzle structure 20 is constructed with opposing channels 24 that engage over corresponding edge portions of the ceiling panel 12. A pair of elongate adapters 26 of channel-shape cross section interconnect the attenuation chamber 14 with the nozzle structure 20. The lower flanges of the adapters 26 overlie corresponding upper flanges of the nozzle structure 20, whereas the upper flanges of the adapters 26 underlie the lower surface of duct 12. A perforated airflow restrictor plate 28 is sandwiched between the upper flanges of the adapters 26 and the lower surface of duct 12 to restrict the flow of air flowing from the noise attenuation chamber 14 to nozzle structure 20. Nozzle structure 20 includes a plurality of spaced-apart openings or air jets 30 to discharge air into an aircraft cabin at desired directions.

In an effort to reduce the noise of the air passing through regulator 10, sound absorbing panels 32 are mounted on the inside sidewalls of the attenuation chamber 14. A similar panel 34 is mounted on the upper or inside surface of nozzle structure 20. Openings 34 are formed in the panel 32 to permit air from chamber 14 to flow out through the air jets 30 formed in the nozzle structure 20. The sound absorbing panels 32 and 34 are typically constructed from fiberglass or NOMEX TM felt. As apparent from FIG. 1, air regulator 10 is of complex construction composed of numerous components. As a result, the air regulator 10 is labor intensive and, thus, expensive to fabricate and install.

Figure 2:
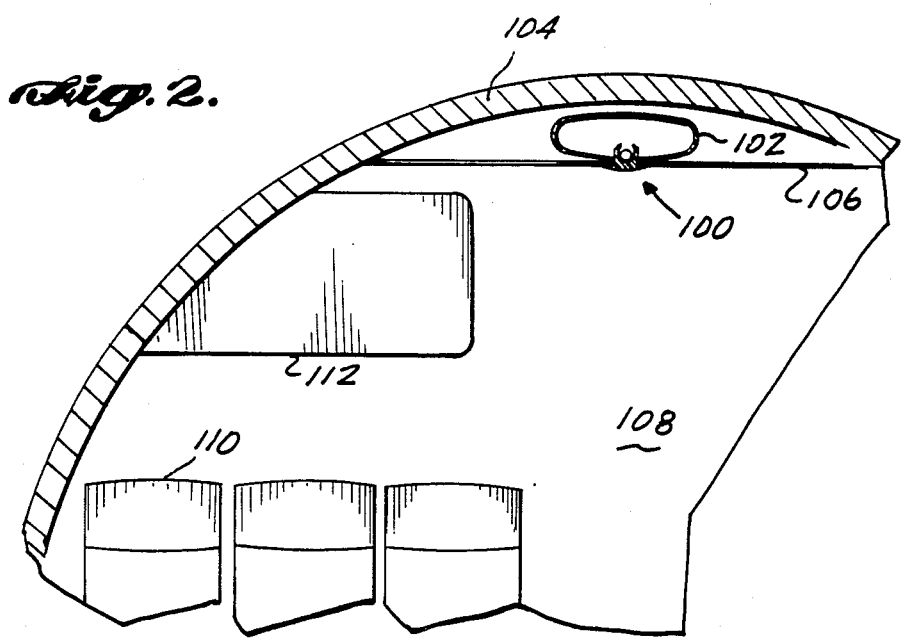
FIG. 2 is a fragmentary, partial cross-sectional view of the self-cleaning airflow regulating device of the present invention shown installed in an air delivery duct located in the ceiling of the cabin of an aircraft.

Next considering the present invention, referring initially to FIG. 2, a self-cleaning airflow regulating device 100 is utilized in conjunction with an overhead duct 102 located between the top central portion of fuselage 104 and the ceiling 106 of the passenger cabin 108 of an aircraft. The passenger compartment 108 includes a plurality of seats 110 and an overhead storage compartment 112 cantilevered from the fuselage inwardly toward the longitudinal center of the aircraft at a location above seats 110. Although duct 102 is illustrated as being generally oval in shape, it is to be understood that the duct may be formed in other cross-sectional shapes, such as square, rectangular or circular, without departing from the spirit or scope of the present invention.

Figure 3:
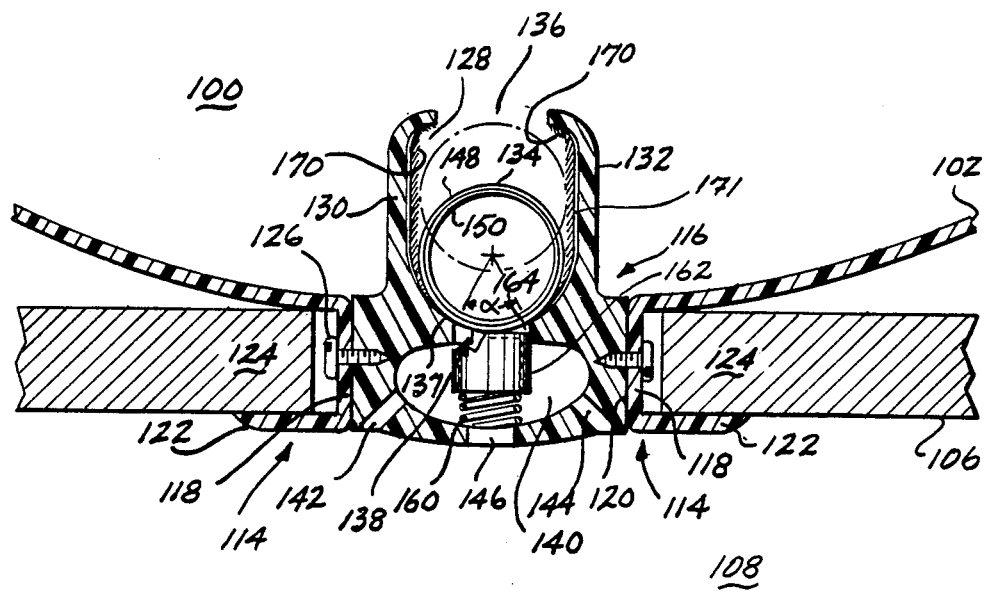
FIG. 3 is an enlarged, cross-sectional view of the airflow regulator shown in FIG. 2.

Referring additionally to FIG. 3, the airflow regulator 100 is fastened to the bottom central portion of the duct 102 to actually form part of the duct. As such, the air flow regulator preferably extends along a substantial length, if not substantially the entire length, of the duct 102. The duct 102 is constructed with a pair of opposing, spaced-apart, channel-shaped edge portions 114 that receive the body 116 of the airflow regulator 100 therebetween. The two edge portions 114 are formed with vertical web members 118 which extend along the vertical sidewalls 120 of the body 116 and with lower horizontal flanges 122 which cooperatively engage over the undersides of the edge portions 124 of the ceiling 106. A plurality of spaced-apart fasteners, such as screws 126, engages through close-fitting clearance holes formed in the webs 118 to extend into the sidewalls 120 of the regulator body 116, thereby to securely attach the lower edge portions 114 of the duct 102 to the regulator body.

The regulator body 116 includes a restriction chamber 128 extending upwardly into the duct 102. The restriction chamber 128 is generally in the form of a "U" or bight-shaped trough, having a pair of spaced-apart, upwardly extending sidewalls 130 and 132 projecting into the interior of the duct 102. The sidewalls 130 and 132 are spaced apart a distance appropriate to closely receive a poppet valve or cylinder 134 between them. The upper edge portions of the sidewalls 130 and 132 are curved inwardly towards each other to define slot or inlet opening 136 through which air flowing through the duct 102 enters the restriction chamber 128. Also, the width separating the upper edges of the sidewalls 130 and 132 is less than the outside diameter of poppet cylinder 134 thereby to maintain the poppet cylinder captive within the restriction chamber 128.

The restriction chamber 128 is formed with a rounded lower portion to define a seat 137 for the poppet cylinder. Preferably, the curvature of the restriction chamber seat 137 is slightly larger than the outer diameter of the poppet cylinder so that a large proportion of the circumferential area of the poppet cylinder (approximately 270 degrees) is exposed to the restriction chamber. It is through this exposed area that air within the restriction chamber enters the poppet cylinder, with the poppet cylinder thus serving as an airflow restrictor. The air within the interior of the poppet cylinder 134 exits the restriction chamber 128 through a lower outlet slot or opening 138 formed in the base of the "U" or bight-shaped trough of the poppet cylinder. As illustrated in FIG. 3, this exiting air passes through the lower circumferential portion of the poppet cylinder 134 that is in alignment with outlet opening 138. This portion of the poppet cylinder consists of approximately 30 degrees of the circumference of the poppet cylinder as indicated by the angle α in FIG. 3.

The height of the restriction chamber 128 extending from the elevation of the outlet 138 at the central, bottom portion of the restriction chamber upwardly to the elevation of inlet 136 at the top of the restriction chamber is greater than the diameter of the poppet cylinder 134. As explained more fully below, during the use of the present invention, the poppet cylinder shifts from a retracted or upward position shown in broken line in FIG. 3 to a lowered or extended position shown in solid line in this figure. The extension or downward movement of the poppet cylinder is caused by the reaction of the air in the restriction chamber 128 the pushing against the outer, upwardly exposed surface of the poppet cylinder 134. It will be appreciated that a decrease in the flow rate and pressure of the air that enters the restriction chamber 128 from the duct 102 occurs during passage of the air through the poppet cylinder and into the interior thereof. A further decrease in the pressure and flow rate of the air occurs as the air passes through the lower, exit side of the poppet cylinder and out through the outlet 138.

Upon its exit from the poppet cylinder 134, the air flows through the outlet 138 and into an oval-shaped diffuser chamber 140 located in the lower or base portion of the regulator body 114. A plurality of spaced-apart outlets, such as diagonally disposed outlets 142 and 144 and vertical outlet 146, direct the ventilation air from the diffuser chamber into the aircraft cabin 108 (see FIG. 2) or other enclosure being ventilated. It is to be understood that outlets other than outlets 142, 144 and 146 may be employed to discharge the ventilation air from the regulating device 100 and into the passenger cabin 108.

Figure 7:
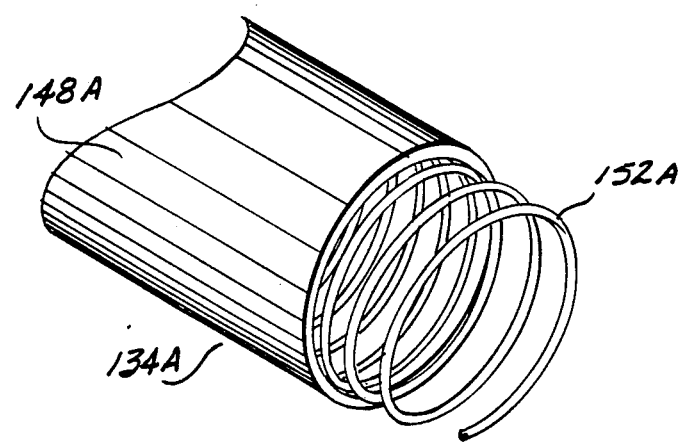
FIG. 7 is an enlarged, fragmentary pictorial view of a preferred embodiment of a poppet cylinder of the present invention.
Figure 8:
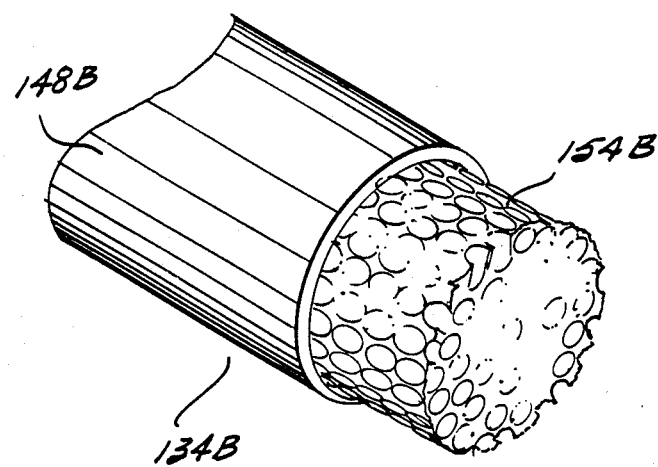
FIG. 8 is an enlarged, fragmentary pictorial view of another preferred embodiment of a poppet cylinder of the present invention.

Referring specifically to FIGS. 3, 7 and 8, the poppet cylinder 134 preferably is constructed with an outer fabric or cloth or fiber composite sleeve 148 formed from fiberglass, NOMEX TM or other suitable material supported by an underlying frame 150 to support the poppet cylinder in a cylindrical shape. NOMEX TM is a trademark of DuPont and is composed of temperature retardant strands of thermoplastic thread. As shown in FIG. 7, frame 150 may be composed of a helically wound spring 152A. Alternatively, the frame may be in the form of a thin, perforated cylindrical shell 154B, FIG. 8, which has an open area of from about 60 to 85 percent. Of course, the poppet cylinder and its frame 150 may be constructed in other manners without departing from the spirit or scope of the present invention. Preferably, but not essentially, the poppet cylinder 134 is formed in a continuous length corresponding to the length of regulator body 116. Alternatively, the poppet cylinder 134 can be composed of a series of individual lengths disposed in end-to-end relationship within the restriction chamber 128. The individual lengths composing poppet cylinder 134 may be fastened together by any convenient means to form a continuous member, or left as individual members without departing from the spirit or scope of the present invention. It will be appreciated that by constructing the outer sleeve 148 of the poppet cylinder from fiberglass, NOMEX ™ or similar fabric material the desired regulation of the air flow in duct 102 is achieved without generating a significant level of noise.

The poppet cylinder 134 is biased in the upward ("retracted") direction toward inlet 136 to bear against stops in the form of inwardly curved edge portions of the reaction chamber sidewalls 130 and 132 by a plurality of spaced-apart compression springs 160 which push upwardly against the underside of the poppet cylinder. A cylindrically-shaped retainer cup 162 extends over the upper end portion of each spring 160 and slidably engages within a close-fitting bore 164 formed in the regulator body 116 between restriction chamber 128 and diffuser chamber 140. The retainer cup 162 serves as a guide for spring 160 and also provides a substantially flat bearing surface for pushing against the underside of poppet cylinder 134 without puncturing or otherwise damaging the poppet cylinder. It will be appreciated that bore 164 for the retainer cup 162 is not circumferentially continuous in that the bore intersects the outlet opening or slot 138. Nonetheless, the circumference of bore 164 is sufficient to guide retainer cup 162 for travel therein. The lower end of the compression spring 160 bears against the lower wall of the diffuser chamber.

Continuing to refer specifically to FIG. 3, fibers 170 are mounted on the inside surfaces of walls 130 and 132. Fibers 170 are diagonally disposed relative to the wall surfaces and to the circumference of the poppet cylinder 134. The fibers 170 are oriented on the inside surface of wall 130 to extend diagonally upwardly whereas the fibers 170 are mounted on the inside surface of wall 132 extend diagonally downwardly. As such the fibers 170 on the walls 130 and 132 are actually oriented in the same direction relative to the circumference of the poppet cylinder 134. As discussed more fully below, fibers 170 are of a length so that they reactively push or bear against the outer circumference of the poppet cylinder to cause the poppet cylinder to rotate about its longitudinal, central axis as the poppet cylinder shifts between an upward, retracted position shown in broken line in FIG. 3 and a downward, extended position shown in solid line in FIG. 3.

Fibers 170 are composed of materials which are capable of carrying a compressive load along their lengths thereby to reactively bear against the outer circumference of a poppet cylinder as the poppet cylinder is shifted between retracted and extended positions (e.g., moving in a direction opposite to the diagonal direction that the fibers 170 extend from the walls 130 and 132), while also being resiliently deformable to allow the poppet cylinder to rotate substantially freely relative to the fibers when the poppet cylinder is moving in the same direction as the direction that the fibers extend diagonally outwardly from the sidewalls 130 and 132. For instance, as the poppet cylinder 134 retracts transversely upwardly from the solid line position to the broken line position shown in FIG. 3, the fibers 170 mounted on the inside surface of wall 132 reactively bear against the adjacent outer sleeve 148 of the poppet cylinder thereby to cause the poppet cylinder to rotate in a clockwise direction about its longitudinal axis. On the other hand, during the upward movement of the poppet cylinder, the fibers 170 mounted on wall 130 resiliently deform in the upward direction and thus do not substantially resist the rotation of the poppet cylinder. Conversely, when the poppet cylinder 134 is moving downwardly from the retracted broken line position to the extend solid line position shown in FIG. 3, the fibers 170 mounted on wall 130 reactively bear against the adjacent portion of the outer sleeve 148 of the poppet cylinder thereby causing the poppet cylinder to rotate further in the clockwise direction about its longitudinal axis. Simultaneously, the fibers 170 mounted on wall 132 resiliently deform in the downward direction thereby to permit the poppet cylinder to rotate substantially freely relative to such fibers.

Fibers 170 may be composed of any suitable material having the foregoing characteristics. Exemplary but nonlimiting examples of such fibers include mohair, nylon, and fiberglass. The fibers 170 may be mounted on an underlying base or support layer 171 which in turn is adhered or otherwise securely affixed to the inside surfaces of walls 130 and 131. Such fiber constructions, such as mohair sheets and strips, are articles of commerce.

Figure 9:
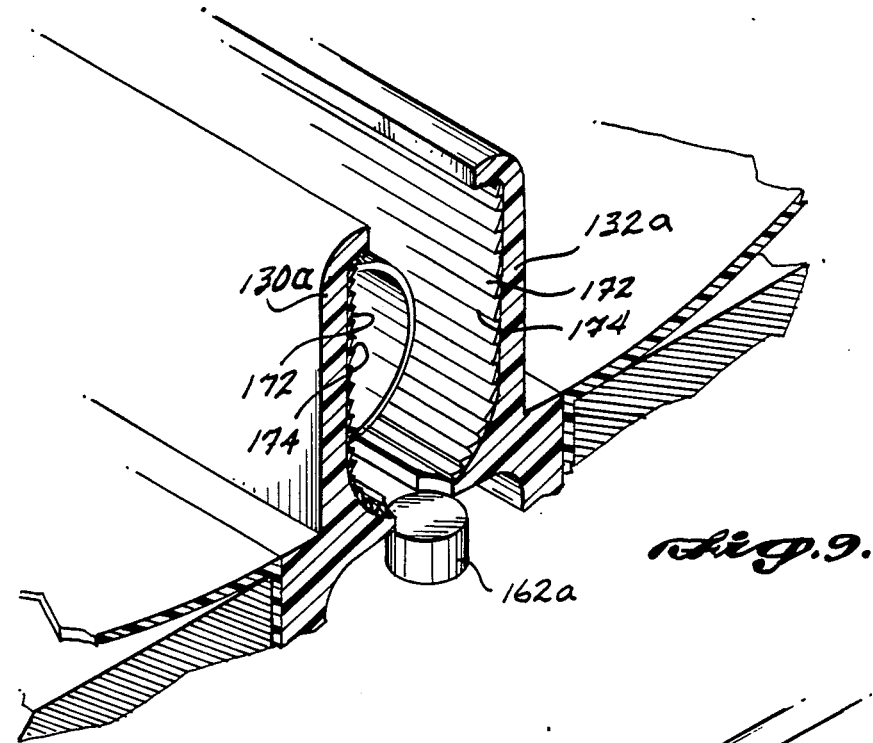
FIG. 9 is an enlarged, fragmentary pictorial view specifically illustrating another preferred construction of the sidewalls of the restriction chamber of an airflow regulator of the present invention; and, FIG. 10 is a view similar to FIG. 9 illustrating a further preferred construction of the sidewalls of a restriction chamber of the present invention.

As a possible alternative to fibers, such as fibers 170, the inside surfaces of the walls 130 and 132 could be contoured or textured to perform substantially the same function as the fibers 170. For instance, as shown in FIG. 9, the inside surfaces of the walls 130 and 132 may be contoured or textured in the form of rows of flexible or resilient sawteeth or serrations 172 extending in a downwardly direction on the wall 132a and in the upwardly direction on the wall 130a. As the poppet cylinder 134 is shifted downwardly, the upper or leading edges 174 of the teeth 172 on wall 130a reactively bear against outer sleeve 148 of the poppet cylinder to cause the poppet cylinder to rotate in a clockwise direction about its longitudinal axis. Conversely, as the poppet cylinder shifts upwardly through the restriction chamber, the leading or lower edges 174 of the teeth 172 on the wall 132a reactively bear against the outer sleeve 148 of the poppet cylinder causing the poppet cylinder to rotate further in a clockwise direction about its longitudinal axis. Thus, it will be appreciated that the suitably resilient teeth 172 could perform substantially the same function carried out by fibers 170 shown in FIG. 3.

Figure 10:
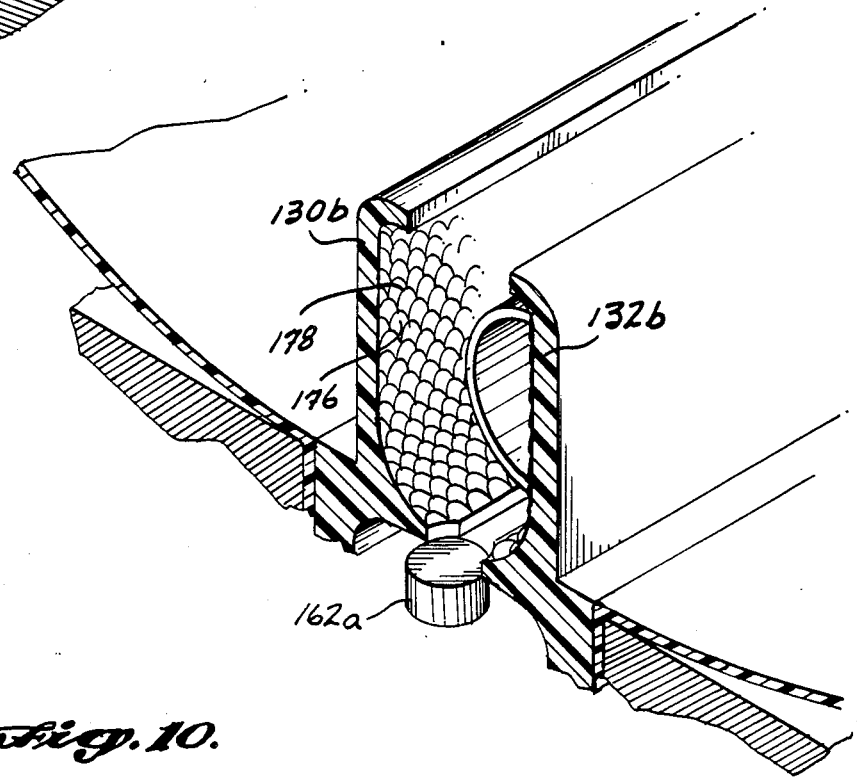

As another possible alternative to fibers 170, the inside surfaces of the walls 130b and 132b could be contoured or textured in the form of horizontal rows of flexible scales 176 that resemble fish scales, FIG. 10. On the wall 132b, the leading or rounded edges 178 of the scales 176 are disposed in a downward direction whereas on the wall 130b, the leading edges of the scales are disposed in the upward direction thereby corresponding to the orientations of teeth 132 in FIG. 9 and fibers 170 in FIG. 3. As such, the scales 176 could perform substantially the same function as performed by the teeth 172 and the fibers 170.

Next considering the operation of the airflow regulator 100, in the ventilation of cabin 108, conditioned air is distributed to the cabin through supply duct 102. The pressurized air in the duct 102 enters restriction chamber 128 through inlet 136 to bear against the exposed surface of the upwardly retracted poppet cylinder 134 which is schematically depicted in broken line in FIG. 3. The pressure of the air bearing against the retracted poppet cylinder causes the poppet cylinder to shift downwardly within the restriction chamber 128 to the extended position shown in solid line in FIG. 3. During this downward descent of the poppet cylinder, the fibers 170 mounted on the inside surface of sidewall 130 reactively bear against the outer circumference of the poppet cylinder outer sleeve 148 to cause the poppet cylinder to rotate in a clockwise direction about its longitudinal axis until the poppet cylinder rests on the seat 137.

The conditioned air in the restriction chamber 128 enters the poppet cylinder 134 through the upward or "exposed" portion of the poppet cylinder. Due to the composition of the outer sleeve 148 of the poppet cylinder, the conditioned air is reduced in flow rate and pressure as it enters the interior of the poppet cylinder. From the interior of the poppet cylinder 134, the conditioned air exits downwardly through the outlet opening 138 to enter the diffuser chamber 40. Again, due to the restrictive nature of the poppet cylinder outer sleeve 148, the conditioned air is reduced in flow rate and pressure as it passes downwardly through outlet opening 138. From the diffuser chamber 140, the air is discharged into the passenger cabin 108 through discharge ports 142, 144 and 146. By constructing the poppet cylinder 134 from fiberglass, NOMEX TM or other fabric material, the air flow into the passenger cabin 108 is regulated to a desired level while producing only a minimum level of noise.

As a result of the rotation of the poppet cylinder 134 during its descent within the restriction chamber 128, a different portion of the outer circumference of the poppet cylinder is placed in alignment with the outlet opening 138. The particulate matter which had settled on the portion of the outer circumference of the poppet cylinder that is now in alignment with the outlet opening 138 is blown off of or otherwise removed from the outer sleeve 148 by the air exiting the poppet cylinder through the outlet opening 138. This automatic self-cleaning of the poppet cylinder 134 now makes it practical to form the poppet cylinder from fabric materials without running an appreciable risk that the poppet cylinder will clog during use.

Upon the termination or substantial reduction of the airflow within duct 102, the downward pressure on the poppet cylinder 134 is removed thereby allowing the poppet cylinder to be retracted back to its upward location by the biasing force of the compression springs 160. During this upward travel of the poppet cylinder within the restriction chamber 128, the fibers 170 mounted on the inside surface of the wall 132 reactively bear against the outer circumference of the poppet cylinder outer sleeve 148 causing the poppet cylinder to rotate further about its longitudinal axis in the clockwise direction. Simultaneously the fibers 170 mounted on the inside surface of the wall 132 readily deflect in the upward direction so as not to substantially hinder the clockwise rotation of the poppet cylinder. As will be appreciated by virtue of the clockwise rotation of the poppet cylinder during its upward travel through the restriction chamber and the further rotation of the poppet cylinder during its next descent through the restriction chamber, e.g., when airflow through the duct 102 is resumed, a different portion of the outer circumference of the outer sleeve 148 is presented over the outlet opening 138. As such, dust and other particulate matter is continually removed from the outer sleeve to prevent the buildup of such matter on the poppet cylinder.

Preferably, for economy of manufacture, the air regulator body 116 is molded as either a single unit or molded in two identical halves about an axis of symmetry extending through the center of inlet 136, restriction chamber 128, outlet 138 and diffuser chamber 140. Alternatively, the regulator body can be formed from components that are adhered or otherwise fastened together.

Figure 4:
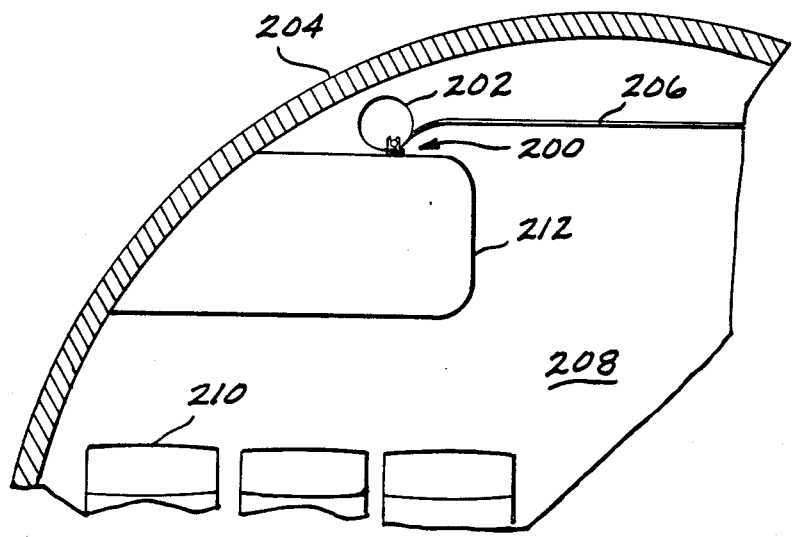
FIG. 4 is a fragmentary, partial cross-sectional view illustrating the airflow regulating device of the present invention installed in an air delivery duct mounted atop overhead storage bins in the passenger cabin of an aircraft.
Figure 5:
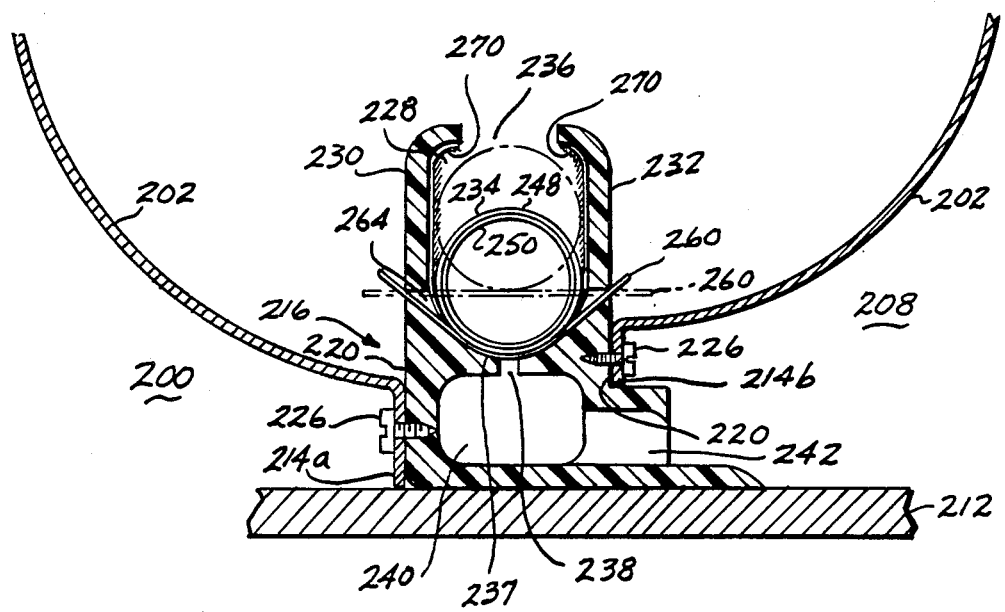
FIG. 5 is an enlarged, fragmentary cross-sectional view of the airflow regulating device shown in FIG. 4.

Next, referring specifically to FIGS. 4 and 5, a further embodiment of the present invention is illustrated in the form of airflow regulator 200 which is employed in conjunction with an air supply duct 202 located above storage compartments 212 for supplying ventilation air to passenger cabin 208. Airflow regulator 200 is structurally and functionally similar to airflow regulator 100, described above, and thus the following description will focus on the differences between the two regulating devices rather than repeating the foregoing description of the constructional and functional features of regulator 100. The components of regulator 200 comparable to those of regulator 100 are designated by similar part numbers with the exception that a 200 series designation is used rather than a 100 series designation as employed with the components of airflow regulator 100.

Referring specifically to FIG. 5, duct 202 is illustrated as being generally circular in cross section; however, it is to be understood that the duct could be constructed in other cross-sectional shapes, such as square or oval, without departing from the spirit or scope of the present invention. The duct 200 is constructed with a lower gap extending along its length defined by downwardly extending, generally parallel flanges 214a and 214b. The flanges are secured to the sides 220 of regulator body 216 by a plurality of fasteners, for instance, screws 226, which extend through clearance holes formed in flanges 214a and 214b to threadably engage the regulator body 216. It will be appreciated that through this construction, the regulator body 216 actually serves as an integral component of duct 202 thereby extending along a substantial length, if not the full length, of the duct 202.

A structural difference between regulator 200 and regulator 100 is the use in regulator 200 of a horizontally disposed discharge outlet 242 for discharging the air from the diffuser chamber 240 into the passenger cabin 208. This orientation of the discharge outlet 242 is employed since regulator 200 is located above storage compartments 212, see FIG. 4. Regulator 100, on the other hand, is located in ceiling 106 of the aircraft and, thus, the outlets 142, 144 and 146 from diffuser chamber 140 direct ventilating air into the passenger cabin 108 in the downward direction.

A further difference between airflow regulating devices 200 and 100 is the method used to bias poppet cylinder 234 in the upward direction toward inlet 236. In regulator 200 this is accomplished by employing a series of nominally straight spring pins 260 that extend through openings 264 formed in the sidewalls 230 and 232 of restriction chamber 228. The spring pins 260, spaced apart along the length of restriction chamber 228, transversely span between sidewalls 230 and 232 to nominally support poppet cylinder 234 in the upward or retracted position shown in broken line in FIG. 5. However, when duct 202 is pressurized, the air entering restriction chamber 202 presses downwardly against the exposed, upwardly directed surface of poppet cylinder 234 thereby placing a sufficient downward force on the poppet cylinder to cause the spring pins 260 to flex in the downward direction as the poppet cylinder descends to the bottom of the restriction chamber 228 to rest against an arcuate seat 237 formed at the base of the restriction chamber.

As with the poppet cylinder 134, during the descent of the poppet cylinder 234, the reactive contact between the fibers 270 mounted on the inside surface of the wall 230 against the outer sleeve 248 of the poppet cylinder causes the poppet cylinder to rotate about its longitudinal central axis. When the airflow in duct 202 is terminated or sufficiently reduced, the spring pins 260 resume their nominally straight shape, shown in broken line in FIG. 5, thereby to raise the poppet cylinder 234 toward the top of the restriction chamber 228 until the poppet cylinder bears against the upper curved flanges of the restriction chamber sidewalls 230 and 232 that define the inlet 236. During the ascent of the poppet cylinder 234, the fibers 270 mounted on the inside surface of walls 232 reactively contact against the outer sleeve 248 of the poppet cylinder causing the poppet cylinder to rotate about its longitudinal axis so that during the next descent of the poppet cylinder a different portion of the outer circumference of the poppet cylinder will be in alignment with the restriction chamber outlet 238. As a result, the particulate matter on this portion of the outer circumference of the poppet cylinder outer sleeve will be dislodged and removed by the air flowing downwardly through the poppet cylinder and out the opening 238. Accordingly, it will be appreciated that the air regulator 200 shown in FIGS. 4 and 5 provides the same advantages provided by the airflow regulator 100 shown in FIGS. 2 and 3.

Figure 6:
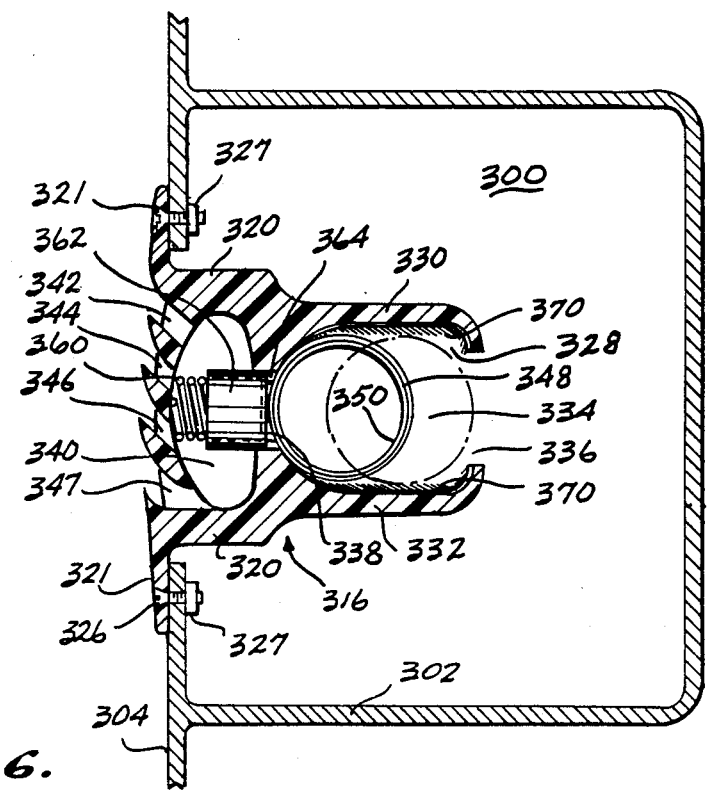
FIG. 6 is an enlarged, cross-sectional view of the airflow regulating device of the present invention as shown installed in the interior sidewall of an aircraft.

FIG. 6 illustrates a further preferred embodiment of the present invention wherein an airflow regulating device 300 is employed in conjunction with an air duct 302 located within a sidewall 304 of an aircraft or other structure. The air regulator 300 is structurally and operationally very similar to the airflow regulators 100 and 200 previously described. As such, only those aspects of the airflow regulator 300 that differ from the airflow regulators 100 and 200 will be described in detail. The components of the airflow regulator 300 that are comparable to those of the airflow regulators 100 and 200 are similarly numbered with the exception that such components are given a 300 series number.

As illustrated in FIG. 6, the airflow regulator 300 is disposed approximately 90 degrees from the orientation of the airflow regulators 100 and 200. As with airflow regulators 100 and 200, a substantial portion of airflow regulator 300 is disposed within the interior of duct 302. The airflow regulator 300 is mounted within the duct 302 by hardware members in the form of screws 326 that extend through beveled clearance holes formed in flange portions 321 extending transversely from the sides 320 of regulator body 316 and through clearance holes formed in wall 304 to threadably engage nuts 327.

The air in a diffuser chamber 340 is discharged through a plurality of upwardly directed outlet passageways 342, 344, 346 and 347. It is to be understood that these passageways may extend in other directions than illustrated in FIG. 6 and may be greater or lesser in number than shown in FIG. 6 without departing from the spirit or scope of the present invention. Moreover, it will be appreciated that by the above construction, the airflow regulator 300 provides the same advantages and advances provided by the airflow regulators 100 and 200.

Various preferred embodiments of fluid flow regulating device of the present invention have been described. It will be appreciated by those skilled in the art of the present invention that the present invention may be used to an advantage in any situation where it is desirable to regulate the flow of fluid, especially air, while minimizing the turbulence produced in the fluid. Therefore, it is to be understood by those skilled in the art that changes, additions and variations may be made in the form and detail of the description of the present invention set forth above without departing from the spirit or essential characteristics thereof. Particular embodiments of the fluid regulating devices described above are therefore to be considered in all respects as illustrative and not restrictive. The scope of the present invention is as set forth in the appended claims rather than being limited to the foregoing examples of the fluid flow regulating devices.

The embodiments of the invention in which an exclusive property or privilege is claimed are defined as follows:

1. A self-cleaning airflow regulator, comprising:
   (a) a housing including:
      a first chamber having a pair of spaced-apart sidewalls;
      an air inlet in airflow communication with the first chamber; and
      an air outlet in airflow communication with the first chamber at a location spaced from the air inlet;
   (b) a close fitting, partially pervious poppet cylinder within the first chamber at a location between the sidewalls thereof to occupy substantially the entire width separating the sidewalls, the poppet cylinder adapted to move transversely of its length along the sidewalls toward and away from the air inlet in response to the level of airflow through the first chamber;
   (c) means for biasing the poppet cylinder in the direction towards the air inlet to shift the poppet cylinder towards the air inlet when no air is flowing into the first chamber through the air inlet; and,
   (d) reactive contact means associated with the sidewalls of the housing which engage the poppet cylinder to cause the poppet cylinder to rotate about its longitudinal axis as the poppet cylinder moves along the housing sidewalls toward and away from the air inlet.

2. The airflow regulator according to claim 1, wherein the housing sidewalls are disposed in spaced, parallel relationship to each other.

3. The airflow regulator according to claim 1, wherein the housing sidewalls have corresponding edge portions that extend towards each other to define the air inlet.

4. The airflow regulator according to claim 1, wherein the housing first chamber in cross section is in the form of an elongate trough shape, wherein the sidewalls of the housing first chamber form the sidewalls of the trough shape, the air outlet of the housing first chamber is located in the base of the trough shape and the air inlet of the housing first chamber corresponds to the opening defined by the edges of the trough shape opposite the base of the trough shape.

5. The airflow regulator according to claim 4, wherein the sidewalls of the trough shape are substantially parallel to each other and spaced apart at a distance to closely receive the poppet cylinder therebetween.

6. The airflow regulator according to claim 1, wherein the poppet cylinder is in the form of a cylindrical tube having opening formed therein.

7. The airflow regulator according to claim 1, wherein the poppet cylinder is composed of partially air pervious, flexible material supported by an underlying frame to form a cylindrical, tubular shape.

8. The airflow regulator according to claim 7, wherein the frame is selected from the group consisting of a helically wound member and a perforated tube.

9. The airflow regulator according to claim 7, wherein the partially air impervious material is composed of a fibrous material selected from the group consisting of fiberglass, NOMEX TM and cloth.

10. The airflow regulator according to claim 1, wherein the inlet and outlet of the first chamber are located at opposite sides of the poppet cylinder.

11. The airflow regulator according to claim 1, wherein the biasing means are selected from the group consisting of:
compression springs bearing against the outer circumference of the poppet cylinder; and,
spring pins spanning between the housing walls and bearing against the outer circumference of the poppet cylinder.

12. The airflow regulator according to claim 1, wherein the reactive contact means comprise resilient means.

13. The airflow regulator according to claim 12, wherein the resilient means comprise cut piles mounted on the housing sidewalls for contact with the outer circumference of the poppet cylinder, the cut piles being disposed diagonally to the surface of the housing sidewalls and transversely to the length of the poppet cylinder all in substantially the same direction relative to the circumference of the poppet cylinder.

14. The airflow regulator according to claim 1, wherein the reactive contact means comprise textured means on the housing sidewalls selected from the group consisting of teeth, serrations and scales, said textured means oriented relative to the housing sidewalls and the poppet cylinder in substantially the same direction relative to the circumference of the poppet cylinder to contact against the outer circumference of the poppet cylinder as the poppet cylinder moves along the sidewalls.

15. The airflow regulator according to claim 14, wherein the reactive contact means are resilient.

16. The airflow regulator according to claim 1, further comprising a second chamber in airflow receiving communication with the outlet of the first chamber, the second chamber having outlet means to discharge air received from the first chamber into the ambient in a substantially uniform manner.

17. A self-cleaning fluid flow regulator, comprising:
(a) a partially fluid pervious poppet cylinder;
(b) a regulator body comprising:
a restriction chamber composed of a pair of spaced-apart sidewalls for closely receiving the poppet cylinder therebetween to enable the poppet cylinder to move along the sidewalls in a direction generally transversely to the length of the poppet cylinder;
an inlet for directing fluid into the restriction chamber; and,
an outlet for directing fluid out of the restriction chamber, the outlet being located on the opposite side of the poppet cylinder from the location of the fluid inlet;
(c) biasing means acting on the poppet cylinder to nominally bias the poppet cylinder toward the inlet of the restriction chamber, the biasing means being overcome during fluid flow into the restriction chamber through the inlet and out of the restriction chamber through the outlet whereby the poppet cylinder is shifted transversely of its length within the restriction chamber in a direction away from the restriction chamber inlet; and,
(d) means for rotating the poppet cylinder about its longitudinal axis as the poppet cylinder moves transversely within the restriction chamber toward and away from the inlet.

18. The flow regulator according to claim 17, wherein the poppet cylinder is in the form of a cylindrical tube having openings formed therein.

19. The flow regulator according to claim 17, wherein the poppet cylinder is composed of partially air pervious, flexible material supported in a cylindrical shape by an underlying frame.

20. The flow regulator according to claim 19, wherein the frame is selected from the group consisting of a helically wound member and a perforated tube.

21. The flow regulator according to claim 19, wherein the partially air pervious material is a fibrous material selected from the group consisting of fiberglass, NOMEX TM and cloth.

22. The flow regulator according to claim 17, wherein the sidewalls of the restriction chamber are substantially parallel to each other and spaced apart a distance from each other to closely receive the poppet cylinder therebetween.

23. The flow regulator according to claim 17, wherein the sidewalls of the restriction chamber have corresponding edge portions that extend towards each other to define the inlet for the restriction chamber.

24. The flow regulator according to claim 17, wherein the inlet for the restriction chamber is in fluid flow communication with a fluid supply source.

25. The flow regulator according to claim 17, wherein the restriction chamber in cross section is in the shape of a bight, wherein the sidewalls of the restriction chamber form the sidewalls of the bight, the outlet of the restriction chamber is located in the base of the bight and the inlet of the restriction chamber is composed of an opening defined by the edges of the sidewalls of the bight opposite the base of the bight.

26. The flow regulator according to claim 25, wherein the sidewalls of the bight are disposed in substantially parallel relationship to each other and spaced apart to receive the poppet cylinder closely therebetween.

27. The flow regulator according to claim 17, wherein the biasing means push against the side of the poppet cylinder.

28. The flow regulator according to claim 27, wherein the biasing means push agaist the poppet cylinder at several locations spaced along the length of the poppet cylinder.

29. The flow regulator according to claim 17, wherein the inlet and outlet for the restriction chamber are located on diametrically opposite sides of the poppet cylinder.

30. The flow regulator according to claim 17, wherein the rotation means are selected from the group consisting of:
(a) fibers mounted on the sidewalls of the restriction chamber for reactive contact with the exterior of the poppet cylinder, the fibers disposed diagonally to the sidewalls in a direction corresponding to the circumference of the poppet cylinder;
(b) fibers mounted on the poppet cylinder for reactive contact with the sidewalls of the restriction chamber, the fibers disposed at an angle to the outer circumference of the poppet cylinder between an angle extending tangentially to the outer surface of the poppet cylinder and an angle extending radially outwardly from the outer surface of the poppet cylinder;
(c) textured means selected from the group consisting of flexible teeth, serrations and scales on the sidewalls of the restriction chamber for reactive contact with the outer circumference of the poppet cylinder, the textured means oriented slanted relative to the plane of the sidewalls of the restriction chamber in a direction corresponding to the circumference of the poppet cylinder; and,
(d) textured means selected from the group consisting of flexible teeth, serrations and scales, on the outer circumference of the poppet cylinder for reactive contact with the sidewalls of the restriction chamber, the textured means extending from the outer circumference of the poppet cylinder at an angle between an angle tangentially to the outer surface of the poppet cylinder and an angle radially to the outer surface of the poppet cylinder.

31. The flow regulator according to claim 17, further comprising a balance chamber in airflow receiving communication with the outlet of the restriction chamber, the balance chamber having outlet means to discharge air received from the restriction chamber into the ambient in a substantially uniform manner.

32. A self-cleaning airflow regulator for regulating the flow of supply air delivered to an enclosure, such as an aircraft cabin, comprising:
(a) an elongate, partially air pervious poppet cylinder;
(b) a regulator body comprising:
an elongate restriction chamber composed of a pair of spaced-apart sidewalls for closely receiving the poppet cylinder therebetween and permitting the poppet cylinder to move along the sidewalls in a direction generally transversely to the length of the poppet cylinder;
an inlet in air receiving communication with an air supply for directing air into the restriction chamber; and,
an outlet for directing air out of a restriction chamber, the outlet being located on the opposite side of the poppet cylinder from the location of the inlet;
(c) resilient biasing means acting on the poppet cylinder to bias the poppet cylinder for movement toward the inlet of the restriction chamber, the biasing means being overcome during airflow into the restriction chamber through the inlet and out the restriction chamber through the outlet whereby the force generated by the reaction of the airflow entering the restriction chamber against the poppet cylinder causes the poppet cylinder to shift transversely of its length within the restriction chamber in a direction away from the restriction chamber inlet; and,
(d) means for rotating the poppet cylinder about its longitudinal axis as the poppet cylinder moves transversely within the restriction chamber toward and away from the inlet.

33. The airflow regulator according to claim 32, wherein the sidewalls of the restriction chamber are substantially parallel to each other and spaced apart a distance from each other to closely receive the poppet cylinder therebetween.

34. The airflow regulator according to claim 32, wherein the biasing means act against the poppet cylinder at spaced-apart locations along the length of the poppet cylinder.

35. The airflow regulator according to claim 32, wherein the rotation means are selected from the group consisting of:
(a) fibers mounted on the sidewalls of the restriction chamber for reactive contact with the exterior of the poppet cylinder, the fibers disposed diagonally to the sidewalls in a direction corresponding to the circumference of the poppet cylinder; and,
(b) fibers mounted on the poppet cylinder for reactive contact with the sidewalls of the restriction chamber, the fibers disposed at an angle to the outer circumference of the poppet cylinder between an angle extending tangentially to the outer surface of the poppet cylinder and an angle extending normally outwardly from the outer surface of the poppet cylinder;
(c) textured means on the sidewalls of the restriction chamber for reactive contact with the outer circumference of the poppet cylinder, the textured means being oriented relative to the plane of the sidewalls of the restriction chamber in a direction corresponding to the circumference of the poppet cylinder; and,
(d) textured means on the outer circumference of the poppet cylinder for reactive contact with the sidewalls of the restriction chamber, the textured means extending from the outer circumference of the poppet cylinder at an angle between an angle tangentially to the outer surface of the poppet cylinder and an angle normal to the outer surface of the poppet cylinder.

36. The airflow regulator according to claim 35, wherein the textured means are selected from the group consisting of flexible teeth, serrations and scales.

37. The airflow regulator according to claim 32, further comprising a balance chamber in airflow receiving communication with the outlet of the restriction chamber, the balance chamber having outlet means to discharge air received from the restriction chamber into the enclosure in a substantially uniform manner.

38. The airflow regulator according to claim 32, wherein:
the supply air is delivered to the enclosure in an elongate duct extending along the enclosure;
the regulator body is secured to the duct and extends along the length of the duct to serve as a part of the duct.

39. The airflow regulator according to claim 32, wherein the restriction chamber at least partially extends into the interior of the duct.

* * * * *